United States Patent [19]

Niki et al.

[11] 4,062,409

[45] Dec. 13, 1977

[54] METHOD FOR THE PRODUCTION OF FISH MEAT POWDER RETAINING FUNCTIONAL PROPERTIES OF FRESH FISH MEAT

[75] Inventors: Hiroshi Niki; Eiki Deya; Toru Doi; Kenkichi Ahiko; Hiromichi Hayashi, all of Sapporo, Japan

[73] Assignee: Snow Brand Milk Products, Co., Ltd., Sapporo, Japan

[21] Appl. No.: 706,620

[22] Filed: July 19, 1976

[30] Foreign Application Priority Data

July 23, 1975   Japan .................................. 50-90655

[51] Int. Cl.² ............................................ A22C 25/00
[52] U.S. Cl. .................................. 426/643; 426/656; 426/657
[58] Field of Search ............... 426/574, 643, 573, 641, 426/470, 471, 583, 656, 657

[56] References Cited

U.S. PATENT DOCUMENTS 3,529,967   9/1970   Riisberg .......................... 426/641 X
3,922,372   11/1975   Hasegawa ............................ 426/574

Primary Examiner—Raymond N. Jones
Assistant Examiner—R. A. Yoncoskie
Attorney, Agent, or Firm—Lane, Aitken, Dunner & Ziems

[57] ABSTRACT

The fish meat slurry which is obtained by finely mincing fresh fish meat or frozen ground fish meat (frozen SURIMI) in conjunction with a water-soluble protein and converting the resulting blend into the form of slurry has viscosity low enough to be easily spray dried into fish meat powder.

2 Claims, No Drawings

METHOD FOR THE PRODUCTION OF FISH MEAT POWDER RETAINING FUNCTIONAL PROPERTIES OF FRESH FISH MEAT

FIELD OF THE INVENTION

This invention relates to a method for the production of fish meat powder which retains the functional properties of fresh fish meat. The term "functional properties of fresh fish meat" as used in the present invention refers to such properties possessed by fresh fish meat as its ability to form KAMABOKO (boiled fish meat paste) which basically issues from its binding property, its water holding property which is indicative of the affinity for water and its emulsifying property which enables formation of a stable emulsion in the presence of added oil.

BACKGROUND OF THE INVENTION

The functional properties of fresh fish meat described above are very important for the processing and utilization of fish meat. The functional properties are degraded in proportion as the denaturation of fish meat proteins progresses. To obtain fish meat powder which retains the functional properties, therefore, it is important that in the course of production of fish meat powder the fish meat proteins be prevented from being denatured.

In recent years, with a view to enhancing the properties of fish meat raw materials for food processing, a technique for the production of fish meat powder retaining the functional properties of fresh fish meat has been developed. Problems are met, however, in the production of such fish meat powder and these problems originate in the difficulty of spray drying a fish meat slurry owing to the high viscosity of the slurry. Therefore, need exists for perfection of a method which lowers the viscosity of fish meat slurry without impairing the inherent functional properties of fresh fish meat and consequently permits the desired spray drying operation to be carried out efficiently.

BRIEF SUMMARY OF THE INVENTION

It has now been discovered that the fish meat slurry made by finely mincing washed raw fish meat prepared from fresh fish meat or frozen SURIMI (refer to U.S. Pat. No. 3,955,011) exhibits a notably lowered viscosity when a water-soluble protein is added to the raw fish meat during its preparation.

It is, therefore, a primary object of this invention to provide a method whereby fish meat powder retaining the functional properties of fresh fish meat can be produced quite advantageously by lowering the viscosity of the fish meat slurry obtained by finely mincing the fish meat stock.

The other objects of the invention will become apparent from the following description of this invention.

DETAILED DESCRIPTION OF THE INVENTION

Fundamentally, the high viscosity exhibited by the fish meat slurry which is obtained by finely mincing fish meat is caused by the actomyosin, one principal component of the muscular tissue of the fish meat. On the other hand, this actomyosin contributes to the "binding property" exhibited by the fish meat in the production of various foodstuffs, particularly the degree of the "consistency" exhibited in the production of products such as KAMABOKO which uses the fish meat in the form of paste. This actomyosin is extremely unstable to heat. When the fish meat slurry is to be spray dried into fish meat powder, therefore, due precautions must be exercised to lower the viscosity of the fish meat slurry without any denaturation of the actomyosin.

From the foregoing point of view, the present invention has achieved success in notably lowering the viscosity of the fish meat slurry without exposing the actomyosin to possible denaturation by adding a water-soluble protein to the fresh fish meat or frozen SURIMI while the fish meat or SURIMI is being finely minced for the preparation of fish meat slurry.

The fish meat to be used as the raw material in the present invention is preferred to be as fresh as possible. The meat taken from the fish body by an ordinary method and then washed with water is used. When the raw fish meat which has undergone the washing treatment is used as the raw material, it is preferable to add to the raw fish meat a carbohydrate such as sucrose and a sugar alcohol such as sorbitol in the combined amount of 5 to 10 percent (by weight) based on the fish meat for the purpose of alleviating possible thermal denaturation of the fish meat protein during the spray drying operation. When frozen SURIMI is used as the raw material, there is no particular need for adding to the SURIMI the carbohydrate and sugar alcohol, for the SURIMI usually incorporates such substances from the beginning. In the preparation of the slurry from such raw fish meat, a cutter and a meat chopper are used to divide the fish meat into fine pieces and a colloid mill is then used to convert the fine pieces into slurry. During conversion into a slurry, this invention requires the water-soluble protein to be incorporated into the meat under processing. According to this invention, therefore, the water-soluble protein is added in a proportion of about 8 to 20 percent by weight to the finely divided pieces of meat obtained by use of the cutter and meat chopper and the resultant mixture is converted into slurry by use of the colloid mill. Examples of the water-soluble protein which can be used in the present invention include egg white albumin, whey protein, serum albumin and soybean protein, other proteins readily soluble in water which are obtained from animals, plants and microorganisms, and water insoluble proteins such as sodium caseinate which are converted into a form readily soluble in water.

When the mixture obtained in accordance with the present invention by the addition of the water-soluble protein such as described above to the raw fish meat is minced into slurry, the produced slurry exhibits a notably low viscosity despite the fact that the solids content of the slurry increases by the amount of the water-soluble protein added thereto.

An experiment was conducted in which egg white albumin and whey protein were each added as the water-soluble protein to the fish meat and the fish meat slurries consequently obtained were tested to determine changes of viscosity due to addition of the proteins. The results were as shown in Tables 1 through 4 below. In these tables, the percentages are expressed in terms of weight.

Table 1

| Sample No. | Fish meat content (%) | Egg white albumin content (%) | Sucrose content (%) | Total solids content (%) | slurry viscosity (poise) |
| --- | --- | --- | --- | --- | --- |
| 1 | 5.8 | 0 | 2.2 | 8.0 | 680 |

Table 1-continued

| Sample No. | Fish meat content (%) | Egg white albumin content (%) | Sucrose content (%) | Total solids content (%) | slurry viscosity (poise) |
|---|---|---|---|---|---|
| 2 | 5.8 | 1.0 | 2.2 | 9.0 | 335 |
| 3 | 5.8 | 2.0 | 2.2 | 10.0 | 130 |
| 4 | 5.8 | 3.0 | 2.2 | 11.0 | 90 |
| 5 | 5.8 | 4.0 | 2.2 | 12.0 | 60 |

Note (1): Each slurry tested was prepared by mixing frozen SURIMI (containing 13.5 % of fish meat solids, 5.0 % of sucrose, 0.2% of polyphosphate and 81.3% of water), a 10 % egg white albumin aqueous solution and water in the proportions indicated below and converting the resultant blend into slurry.

| Sample No. | 1 | 2 | 3 | 4 | 5 |
|---|---|---|---|---|---|
| Frozen SURIMI (g) | 43 | 43 | 43 | 43 | 40 |
| 10% egg white albumin aqueous solution (g) | 0 | 10 | 20 | 30 | 40 |
| Water (g) | 57 | 47 | 37 | 27 | 17 |

Note (2): The viscosity of slurry was measured at pH 7.0 at a temperature of 10° C.
Note (3): The sucrose in the slurry was originally contained in the frozen SURIMI.

Table 2

| Sample No. | Fish meat content (%) | Egg white albumin content (%) | Total solids content (%) | Slurry viscosity (poise) |
|---|---|---|---|---|
| 1 | 6.4 | 0 | 6.4 | ∞ |
| 2 | 6.4 | 1.0 | 7.4 | 200 |
| 3 | 6.4 | 2.0 | 8.4 | 105 |
| 4 | 6.4 | 3.0 | 9.4 | 58 |
| 5 | 6.4 | 4.0 | 10.4 | 50 |

Note (1): Each slurry tested was prepared by mixing water-bleached raw fish meat (containing 16.0% of fish meat solid and 84.0% of water), a 10% egg white albumin aqueous solution and water in the proportions indicated below and converting the resultant blend into slurry.

| Sample No. | 1 | 2 | 3 | 4 | 5 |
|---|---|---|---|---|---|
| Water-bleached raw fish meat (g) | 40 | 40 | 40 | 40 | 40 |
| 10% egg white albumin aqueous solution (g) | 0 | 10 | 20 | 30 | 40 |
| Water (g) | 60 | 50 | 40 | 30 | 20 |

Note (2): The viscosity of slurry was measured at pH 7.0 at a temperature of 10° C.

Table 3

| Sample No. | Fish meat content (%) | Whey protein content (%) | Sucrose content (%) | Total solids content (%) | Slurry viscosity (poise) |
|---|---|---|---|---|---|
| 1 | 5.8 | 0 | 2.2 | 8.0 | 680 |
| 2 | 5.8 | 1.0 | 2.2 | 9.0 | 300 |
| 3 | 5.8 | 2.0 | 2.2 | 10.0 | 140 |
| 4 | 5.8 | 3.0 | 2.2 | 11.0 | 80 |
| 5 | 5.8 | 4.0 | 2.2 | 12.0 | 50 |
| 6 | 5.8 | 5.0 | 2.2 | 13.0 | 45 |

Note (1): Each slurry tested was preared by mixing frozen SURIMI (containing 13.5% of fish meat solids, 5.0 % of sucrose, 0.2% of polyphosphate and 81.3 % of water), a 10% whey protein aqueous solution and water in the proportions indicatedbelow and converting the resultant blend into slurry.

| Sample No. | 1 | 2 | 3 | 4 | 5 | 6 |
|---|---|---|---|---|---|---|
| Frozen ground fish meat (g) | 43 | 43 | 43 | 43 | 43 | 43 |
| 10% whey protein aqueous solution (g) | 0 | 10 | 20 | 30 | 40 | 50 |
| Water (g) | 57 | 47 | 37 | 27 | 17 | 7 |

Note (2): The viscosity of slurry was measured at pH 7.0 at a temperature of 10° C.
Note (3): The sucrose in the slurry was originally contained in the frozen SURIMI.
Note (4): The whey protein was obtained by removing lactose from rennet whey and acid whey by means of membrane treatment.

Table 4

| Sample No. | Fish meat content (%) | Whey protein content (%) | Total solids content (%) | Slurry viscosity (poise) |
|---|---|---|---|---|
| 1 | 6.4 | 0 | 6.4 | ∞ |
| 2 | 6.4 | 1.0 | 7.4 | 210 |
| 3 | 6.4 | 2.0 | 8.4 | 100 |
| 4 | 6.4 | 3.0 | 9.4 | 65 |
| 5 | 6.4 | 4.0 | 10.4 | 55 |

Note (1): Each slurry tested was prepared by mixing washed raw fish meat, a 10% whey protein aqueous solution and water in the proportions indicated below and converting the resultant blend into a slurry, similarly to the slurry in Table 3.

| Sample No. | 1 | 2 | 3 | 4 | 5 |
|---|---|---|---|---|---|
| Water-bleached raw fish meat (g) | 40 | 40 | 40 | 40 | 40 |
| 10% whey protein aqueous solution (g) | 0 | 10 | 20 | 30 | 40 |
| Water (g) | 60 | 50 | 40 | 30 | 20 |

Note (2): The viscosity of slurry was measured at pH 7.0 at a temperature of 10° C.

It is evident from Tables 1-4 above that the slurries obtained by mixing washed raw fish meat and frozen SURIMI with water-soluble proteins such as egg white albumin and whey protein and converting each of the resultant blends into a slurry exhibit notably low degrees of viscosity, indicating that these slurries permit easy spray drying.

When the fish meat slurry prepared as described above is to be spray dried, in order to prevent thermal denaturation as much as possible, the inlet air temperature is preferred to be controlled in the range of 140° to 180° C and the outlet air temperature in the range of 50° to 80° C, respectively.

In the preparation of the fish meat slurry described above, addition to the raw fish meat of an aqueous solution of an acid such as bicarbonate water adjusted to pH 6.0 to 6.2 which readily decomposes and volatilizes at low temperatures (as disclosed in Japanese Laid-open Publication No. 19163/1976) proves to be advantageous because the aqueous solution enables the viscosity of the slurry to be lowered further and permits the consumption of the water-soluble protein required by this invention to be decreased.

Further according to the present invention, the amount of the protein added may be increased beyond the aforementioned range for the purpose of imparting the properties possessed by the water-soluble protein itself to the fish meat powder finally produced as well as for the purpose of lowering the viscosity of the fish meat slurry.

The fish meat powder obtained in accordance with the present invention by subjecting the fish meat slurry to spray drying as described above retains the functional properties of fresh fish meat, i.e., "KAMABOKO forming property," "water holding property" and "emulsifying property" (which will be described specifically in the preferred embodiments to follow). The fish meat powder, therefore, can be extensively utilized in the field of food processing.

By using fresh fish meat or frozen ground fish meat as the starting material and converting this fish meat in conjunction with an added water-soluble protein into slurry as described above, the present invention enables the resultant fish meat slurry to exhibit a notably decreased viscosity and consequently allows the spray drying of fish meat slurry to be efficiently carried out and, at the same time, permits the finally produced fish meat powder to retain the inherent functional properties of the aforementioned fish meat as the starting material and enjoy high preservability.

Now the present invention will be described specifically with reference to preferred embodiments, which are given solely for illustration and should not be considered as limitations to the invention.

EXAMPLE 1

Fish meat taken by an ordinary method from fresh pollack was bleached several times with water five times as large in volume and then drained. Then, 100 kg of the washed raw fish meat (water content 85 percent) was mixed with a solution which had been prepared by dissolving in 150 kg of water 8 kg of whey powder (containing 34 percent of protein, 56 percent of lactose, 5 percent of fats, 3 percent of ash and 2 percent of water), obtained by subjecting whey to ultrafiltration for increasing the protein concentration and spray drying the enriched whey and which had then been adjusted to pH 7.0. The resultant mixture was converted into slurry through treatment in a colloid mill. During the conversion to the slurry, the temperature of the mixture was prevented from rising above 10° C by addition of crushed ice to the mixture. The fish meat slurry thus obtained had a solids content of 9 percent and exhibited a viscosity of about 100 poise. This fish meat slurry was spray dried into fish meat powder, with the inlet air temperature kept in the range of 140° to 150° C and the outlet air temperature in the range of 50° to 60° C. The fish meat powder obtained as described above was tested for KAMABOKO forming property, water retaining property and emulsifying property. The results were as shown in Table 5. As a control experiment, a mixture obtained by washing fish meat from fresh pollack and adding to the bleached fish meat 5 percent by weight of sucrose was subjected to the same procedure.

Table 5

| | Fish meat powder in accordance with this invention | Control |
|---|---|---|
| KAMABOKO forming property | | |
| Jelly strength (g) | 470 | 450 |
| Bending test | AA | AA |
| Water holding property (g/g) | 35 | 38 |
| Emulsifying property (ml/100 mg of protein) | 20 | 22 |

The values given in the table above were obtained by the measurement carried out in accordance with the procedures described below.

KAMABOKO forming property

To the fish meat powder was added water to a water content of 80 percent. The wet fish meat powder was thoroughly kneaded with 2.7 percent by weight of sodium chloride and 7 percent by weight of starch. The resulting mixture was set in a casing and heated at 90° C for 30 minutes. A KAMABOKO thus obtained was tested for jelly strength by an ordinary method and was also subjected to a bending test. In the meantime, in the control experiment, the aforementioned fish meat was thoroughly kneaded with the same proportions of sodium chloride and starch and then subjected to the same procedure for preparation of KAMABOKO. The KAMABOKO thus produced was tested for jelly strength and also subjected to bending test.

Water holding property

The fish meat powder and distilled water added thereto were kneaded in a colloid mill to produce a slurry (having a solids content of 2 percent). The slurry was centrifuged at 10,000 G and the sediment was examined to determine the proportion of the water content (g) to the solids (g) contained therein. The water retaining property was reported in terms of this proportion.

In the control experiment, the aforementioned fish meat was converted into slurry and then subjected to the same procedure as described above to determine the water content of the sediment.

Emulsifying property

The fish meat powder was converted into a slurry as described above (to a solids content of 2 percent). This slurry was agitated at 10,000 r.p.m. and, at the same time, vegetable oil was continuously added dropwise thereto. The largest amount of the oil that permitted formation of emulsion was determined and proportionated to 100 mg of protein contained in the slurry. The emulsifying property was reported in terms of the result of the proportionation.

As is plain from the data of Table 5 above, the fish meat powder obtained by the present invention substantially retains the functional properties of fresh fish meat.

EXAMPLE 2

Frozen SURIMI available on the market (containing 15 percent of fish meat solids, 4.8 percent of sucrose, 0.2 percent of polyphosphate and 80 percent of water) 100 kg in weight was finely divided by a cutter and a meat chopper and mixed with a solution which had been prepared by dissolving in 125 kg of water 27 kg of frozen egg white (consisting of 10 percent of egg white solids and 90 percent of water) and subsequently adjusted to pH 7.0. The resulting mixture was converted into slurry by use of a colloid mill. The fish meat slurry thus obtained exhibited a viscosity in the neighborhood of 100 poise.

By following the procedure described in Example 1, the low-viscosity fish meat slurry prepared as described above was spray dried. The fish meat powder consequently obtained was tested for functional properties by a method similar to that described in Example 1. The results were as shown in Table 6.

By way of a control experiment, the same frozen SURIMI used as the starting material above was immediately tested for functional properties by the same method. The results are additionally shown in the table.

Table 6

| | Fish meat powder in accordance with this invention | Control |
|---|---|---|
| KAMABOKO forming property | | |
| Jelly strength (g) | 380 | 340 |
| Bending test | AA | AA |
| Water holding property (g/g) | 33 | 35 |
| Emulsifying property (ml/100 mg of protein) | 19 | 20 |

It is evident from Table 6 that the fish meat powder prepared in accordance with the present invention by using frozen SURIMI as the starting material exhibits substantially the same functional properties as those of the fish meat powder from the raw fish meat.

What is claimed is:

1. In a method for the production of fish meat powder retaining the functional properties of fresh raw fish meat by mincing fresh raw fish meat or frozen SURIMI, adding water to form a slurry and spray drying the resulting fish meat slurry, the improvement comprising incorporating a water-soluble protein into said slurry in an amount sufficient to lower its viscosity, and wherein said water-soluble protein is a member selected from the group consisting of egg white albumin, whey protein, serum albumin, soybean protein and a water-soluble derivative of sodium caseinate.

2. A method according to claim 1, wherein said water-soluble protein is added in an amount of about 8 to about 20 percent by weight to said fish meat.

* * * * *